(12) United States Patent
Akima et al.

(10) Patent No.: US 7,225,779 B2
(45) Date of Patent: Jun. 5, 2007

(54) INTAKE SYSTEM INCLUDING A RESONANCE CHAMBER

(75) Inventors: Kazuhiro Akima, Wako (JP); Yoshiyuki Umino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 11/236,491

(22) Filed: Sep. 28, 2005

(65) Prior Publication Data

US 2006/0065237 A1 Mar. 30, 2006

(30) Foreign Application Priority Data

Sep. 30, 2004 (JP) .............................. 2004-287587

(51) Int. Cl.
*F02M 35/10* (2006.01)
*F02B 27/02* (2006.01)
(52) U.S. Cl. .......................... 123/184.55; 123/184.56; 123/184.57
(58) Field of Classification Search ........... 123/184.55, 123/184.56, 184.57, 184.53
See application file for complete search history.

(56) References Cited

U.S. PATENT DOCUMENTS

| | | | | |
|---|---|---|---|---|
| 2,894,497 A | * | 7/1959 | Bolles, Jr. ............... | 123/184.31 |
| 4,646,689 A | * | 3/1987 | Katsumoto et al. ..... | 123/184.55 |
| 4,765,286 A | * | 8/1988 | Lyjak et al. ........... | 123/184.55 |
| 5,870,988 A | * | 2/1999 | Fujimori et al. ....... | 123/184.55 |
| 2003/0213456 A1 | * | 11/2003 | Klotz et al. .............. | 123/190.1 |

FOREIGN PATENT DOCUMENTS

| | | |
|---|---|---|
| JP | 3-29581 | 6/1991 |
| JP | 9-264143 | 10/1997 |

* cited by examiner

*Primary Examiner*—Marguerite McMahon
(74) *Attorney, Agent, or Firm*—Westerman, Hattori, Daniels & Adrian, LLP.

(57) ABSTRACT

In an intake system for an engine incorporated with a resonance chamber (32), a variable communication unit (50) for controlling the communication between an intake passage with the resonance chamber comprises an outer tube (51) having an open axial end (51*a*) and an opening (51*b*) defined in a circumferential wall thereof for communication with the resonance chamber and an inner tube (52) rotatably and coaxially received in the outer tube, the inner tube being provided with a communication inlet port (52*a*) at an axial end on a same side as the axial end of the outer tube and an opening (52*b*) in a circumferential wall thereof for defining a communication outlet port (50*a*) jointly with the opening in the outer circumferential wall of the outer tube. The openings of the inner tube and outer tube are configured such that at least one of a distance (L) between the inlet and outlet ports of the communication passage and an opening area (S) of the communication outlet port changes in relation with a relative rotational angle between the inner tube and outer tube. Thereby, the intake system can be formed as a highly compact unit and requires little power to operate.

14 Claims, 10 Drawing Sheets

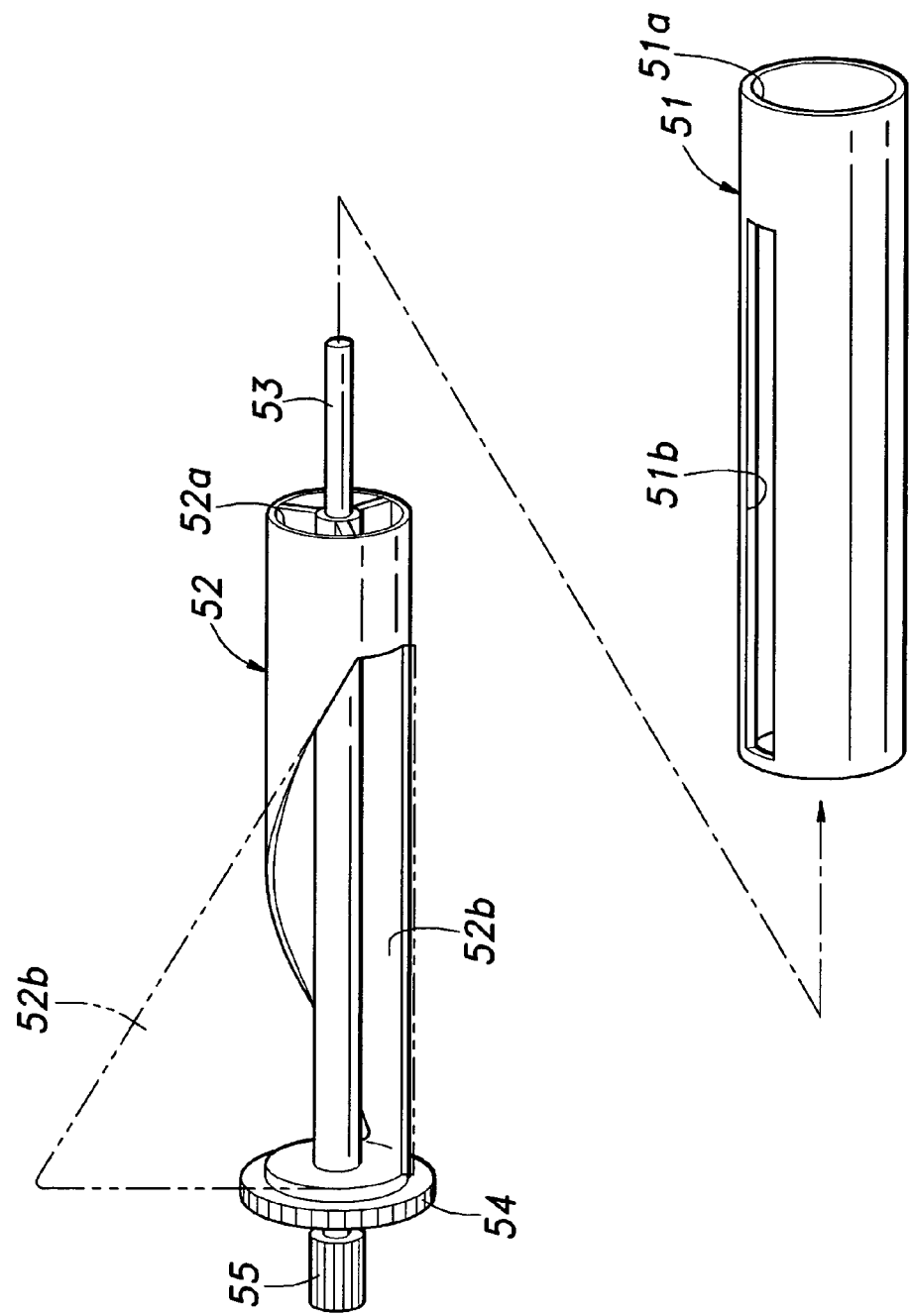

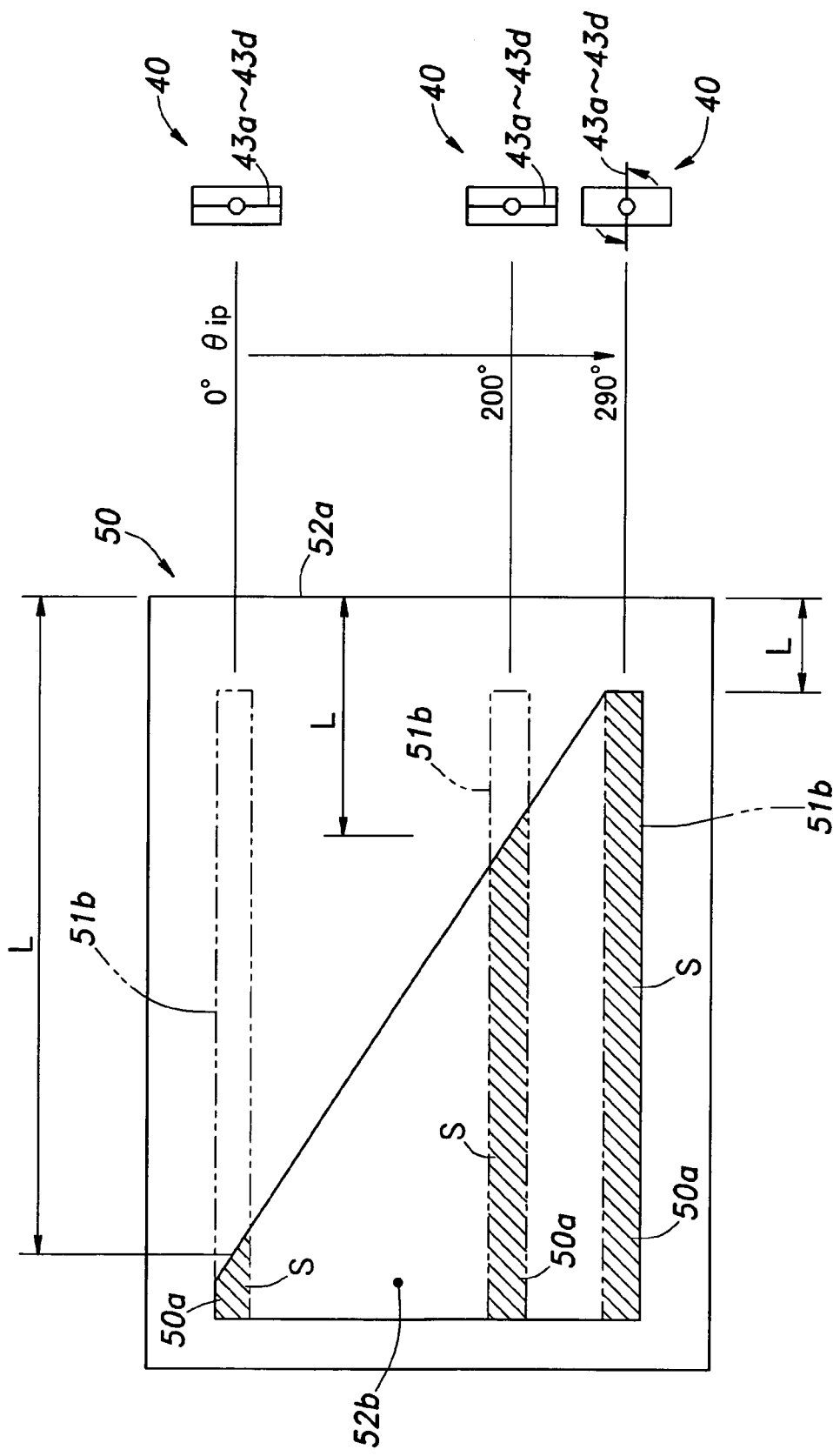

INTAKE SYSTEM INCLUDING A RESONANCE CHAMBER

TECHNICAL FIELD

The present invention relates to an intake system for internal combustion engines, and in particular to an intake system including a resonance chamber for achieving a favorable intake efficiency over a wide operating range by taking advantage of a resonance effect.

BACKGROUND OF THE INVENTION

For the purpose of increasing the output torque of an internal combustion engine, it is desirable to increase the intake efficiency (volumetric efficiency) which is given by dividing the amount of intake air (mixture or air) which is drawn into the combustion chamber during the downward stroke of the piston by the volume of the cylinder. In the field of internal combustion engines, it has been practiced to experimentally determine the volume of a surge tank and/or the length of each independent intake passage of the intake system to maximize the effect of inertia supercharging that makes use of the inertia of the intake flow. It is also known to provide a resonance chamber and provide a supercharging effect and a damping of intake noises by tuning the resonance frequency of the resonance chamber to the pressure pulsation of the intake air caused by the reciprocating action of the engine. The resonance chamber is connected to the intake passage via a communication passage and the length of this communication passage and other factors determine the operating range (engine rotational speed range) over which the desired resonance effect can be obtained.

Such an operating range over which the desired resonance effect can be obtained can be expanded by allowing the length of the communication passage connecting the resonance chamber with the intake passage to be varied depending on the operating condition of the engine. For instance, the intake system may comprise a plurality of sets of intake passages having different lengths and valves for selecting a particular set of intake passages so that the set of intake passages that match the particular operating condition of the engine may be selected by suitably operating the valves. Such an example is disclosed in Japanese patent laid open publication No. 9-264143. It is also known to provide a resonance chamber that can be moved relative to the intake passage and to form a communication passage with a pair of tubes that are telescopically disposed relative to each other so that the length of the communication passage may be varied by moving the resonance chamber in dependence on the rotational speed of the engine (Japanese UM publication No. 03-29581).

However, according to the first example of the prior art, because the configuration of the intake system can be changed only in a stepwise fashion for maintaining the resonance effect in relation with the changing operating condition, it is not suitable for use as an intake system for an automotive engine whose operating condition changes continually. The second example of the prior art allows the configuration of the intake system to be changed in a continuous manner so as to maintain the resonance effect over a wide range without any substantial break. However, the need for the mechanism for moving the resonance chamber creates various problems. First of all, because the resonance chamber has a significant volume, moving the resonance chamber in dependence on the rotational speed of the engine causes a significant change in the outer profile of the intake system, and this makes it highly difficult to install the engine in a limited space of the engine room of an automobile. Also, the casing for the resonance chamber is inevitably heavy in weight owing to the size requirement of the resonance chamber, and the mechanism for moving the resonance chamber casing is required to be correspondingly powerful. This results in a relatively massive actuator and a large consumption of energy. Also, the large mass of the resonance chamber casing prevents a prompt movement of the resonance chamber casing and this impairs the responsiveness and controllability of the intake system.

BRIEF SUMMARY OF THE INVENTION

In view of such problems of the prior art, a primary object of the present invention is to provide an intake system for an internal combustion engine incorporated with a variable frequency resonance chamber which is compact in size and requires little power to operate.

A second object of the present invention is to provide such an intake system which is capable of continuously tuning the resonance chamber to the operating condition of the engine such as the engine rotational speed.

A third object of the present invention is to provide such an intake system which can achieve both resonance supercharging and inertia supercharging by using a highly compact structure.

According to the present invention, at least some of these objects and other objects can be accomplished by providing an intake system for an internal combustion engine, comprising: an intake manifold defining an inlet passage, an intake passage communicating the inlet passage with an intake port of the engine and a resonance chamber communicating with the intake passage via a communication passage; an outer tube supported by the intake manifold and having an axial end communicating with the inlet passage and an opening defined in a circumferential wall thereof for communication with the resonance chamber; an inner tube rotatably and coaxially received in the outer tube, the inner tube defining a communication passage inlet port at an axial end on a same side as the axial end of the outer tube, an internal bore defining the communication passage, an opening defined in a circumferential wall thereof for defining a communication outlet port jointly with the opening in the circumferential wall of the outer tube; and a power actuator for turning at least one of the outer tube and inner tube relative to the other according to an operating condition of the engine such as the rotational speed of the engine; wherein the openings of the inner tube and outer tube are configured such that at least one of a distance between the communication inlet port and communication outlet port, and an opening area of the communication outlet port changes in relation with a relative rotational angle between the inner tube and outer tube.

According to this arrangement, the configuration of the intake system can be changed so as to obtain the resonance effect over a wide operating range without changing the outer profile of the intake system. Because the inner tube or outer tube defining the communication passage has a relative small mass of inertia as compared with the casing for the resonance chamber, the actuator may consist of a highly compact actuator such as an electric motor which requires very little power consumption, and a favorable responsiveness and controllability can be achieved without any difficulty.

According to a certain aspect of the present invention, the power actuator turns at least one of the inner and outer tubes relative to each other in a direction to decrease the distance between the communication inlet port and communication outlet port as the rotational speed of the engine increases. Decreasing the distance has the effect of raising the resonance frequency of the resonance chamber.

This can be accomplished if the opening of one of the outer and inner tubes consists of a linear slot, and the opening of the other of the outer and inner tubes includes a triangular section. Additionally or alternatively, the opening of one of the outer and inner tubes consists of a linear slot, and the opening of the other of the outer and inner tubes includes a linear or spiral slot.

According to another aspect of the present invention, the power actuator turns at least one of the inner and outer tubes relative to each other in a direction to increase the opening area of the communication outlet port as the rotational speed of the engine increases. This can be accomplished if the opening of one of the outer and inner tubes consists of a linear slot, and the opening of the other of the outer and inner tubes includes a triangular section.

According to a preferred embodiment of the present invention, the intake efficiency can be further improved if the resonance supercharging produced by the resonance chamber is combined with the inertia supercharging making use of the inertia of the intake flow. It can be accomplished if the intake passage includes a short intake passage and a long intake passage that are arranged parallel to each other, the intake system further comprising a valve for selectively closing the short intake passage and an actuator for actuating the valve in synchronism with the at least one of the outer and inner tubes that is actuated by the corresponding power actuator.

For the simplification of the overall system, the valve may be actuated by the same actuator as that actuates one of the outer and inner tubes, via a lost motion mechanism. The necessary mechanism can be most simplified if the valve comprises a valve shaft which extends in parallel with a rotational axial line of the inner and outer tubes. In such a case, spur gears may be used in addition to the lost motion mechanism for synchronizing the valve with the action of the mechanism for varying the configuration of the communication passage for the resonance chamber.

According to a preferred embodiment of the present invention, the intake manifold comprises a main body defining a flange surface adapted to abut the intake port of the engine, a partition wall that separates the resonance chamber from the intake passage, and a cover plate that defines at least the resonance chamber jointly with the partition wall. Preferably, the cover plate is provided on a side of the intake manifold main body facing the engine to define a part of the inlet passage jointly with the intake manifold main body.

For both compact design and easy servicing, the actuator for at least one of the outer and inner tubes may be provided externally of the intake manifold main body.

BRIEF DESCRIPTION OF THE DRAWINGS

Now the present invention is described in the following with reference to the appended drawings, in which:

FIG. 9 is an exploded perspective view of the variable communication unit;

FIG. 10 is a diagram showing the actions of the variable communication unit and passage length control valve unit in dependence on the rotational angle of the inner tube;

DETAILED DESCRIPTION OF THE PREFERRED EMBODIMENTS

Figure 1:
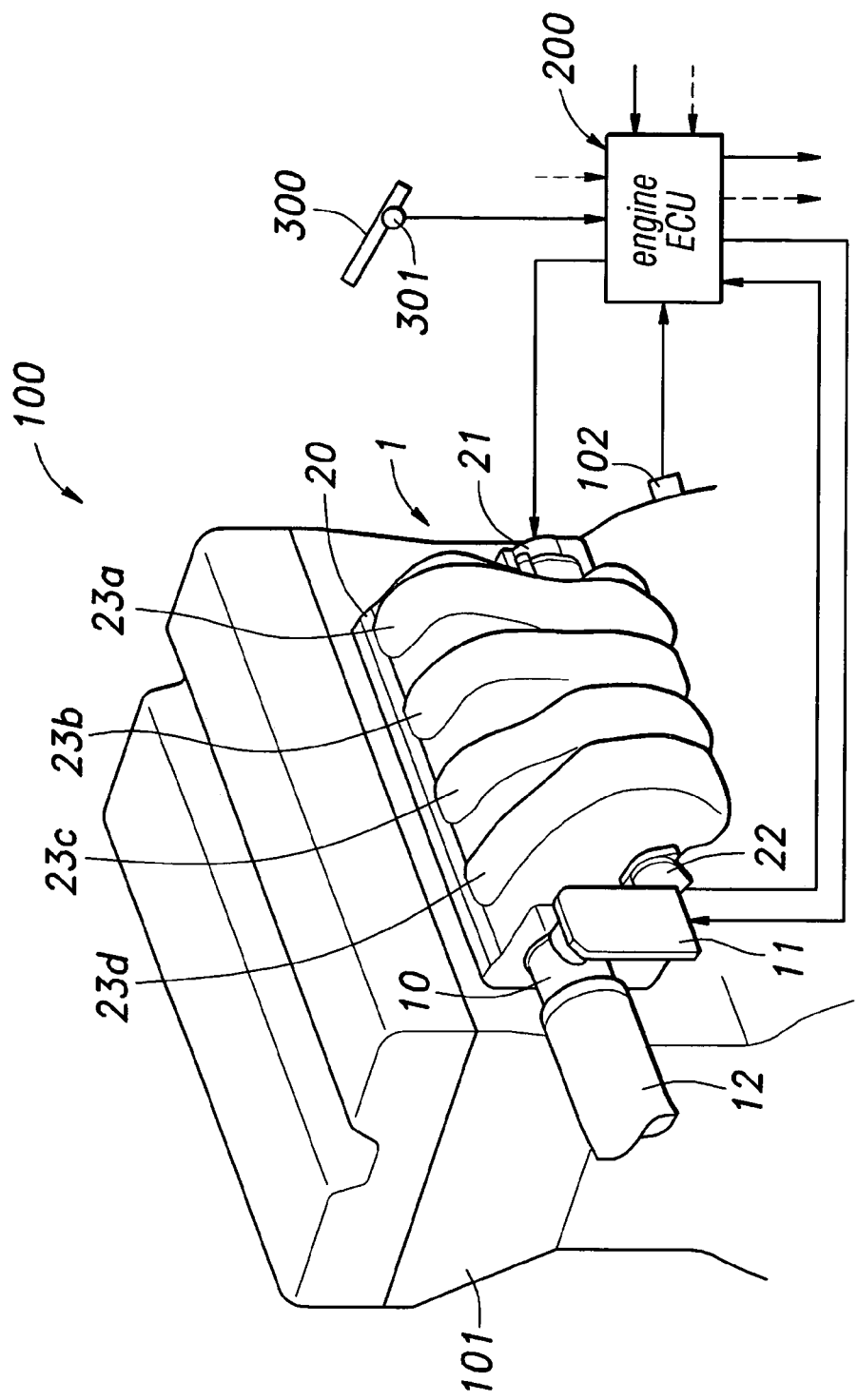
FIG. 1 is a simplified perspective view of an internal combustion engine incorporated with an intake system embodying the present invention.

FIGS. 1 to 10 show a first embodiment of the present invention. FIG. 1 shows an automotive four-stroke in-line multi-cylinder gasoline engine 100, and an intake system 1 embodying the present invention is attached to the cylinder head 101 of this engine. The intake system 1 comprises an electronically controlled throttle unit 10 and an intake manifold 20. The throttle unit 10 is externally provided with a throttle actuator 11. The intake manifold 20 is externally provided with a variable intake passage actuator 21 including an electric motor and a communication sensor 22 which is described hereinafter. The throttle actuator 11 and variable intake passage actuator 21 each include an electric motor, a gear reduction mechanism and a casing. The throttle unit 10 is connected to an intake duct 12 which is in turn connected to an air cleaner not shown in the drawings.

The throttle actuator 11, variable intake passage actuator 21 and communication sensor 22 are connected to an engine ECU 200 typically mounted in the passenger compartment. The throttle actuator 11 and variable intake passage actuator 21 operate under command from the ECU 200, and the communication sensor 22 supplies an inner tube angle θip which is described hereinafter to the ECU 200. The ECU 200 is also connected to an Ne sensor 102 fitted in the engine 100 and an acceleration pedal sensor 301 so that the rotational speed Ne of the engine 100 and the throttle valve angle θth measured by the Ne sensor 102 and acceleration pedal sensor 301, respectively, are supplied to the ECU 200.

Figure 2:
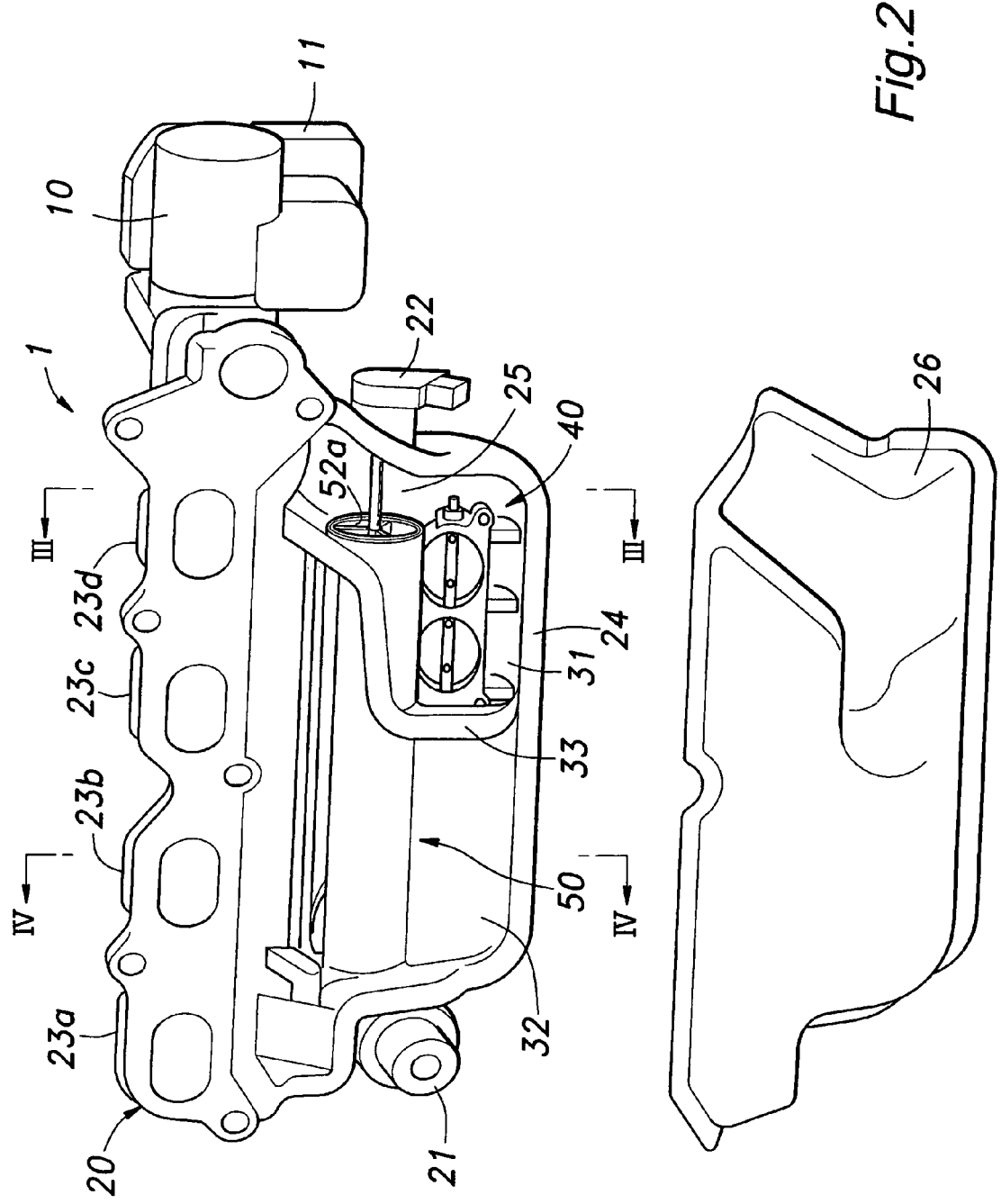
FIG. 2 is an exploded rear perspective view of the intake-system according to the present invention.
Figure 3:
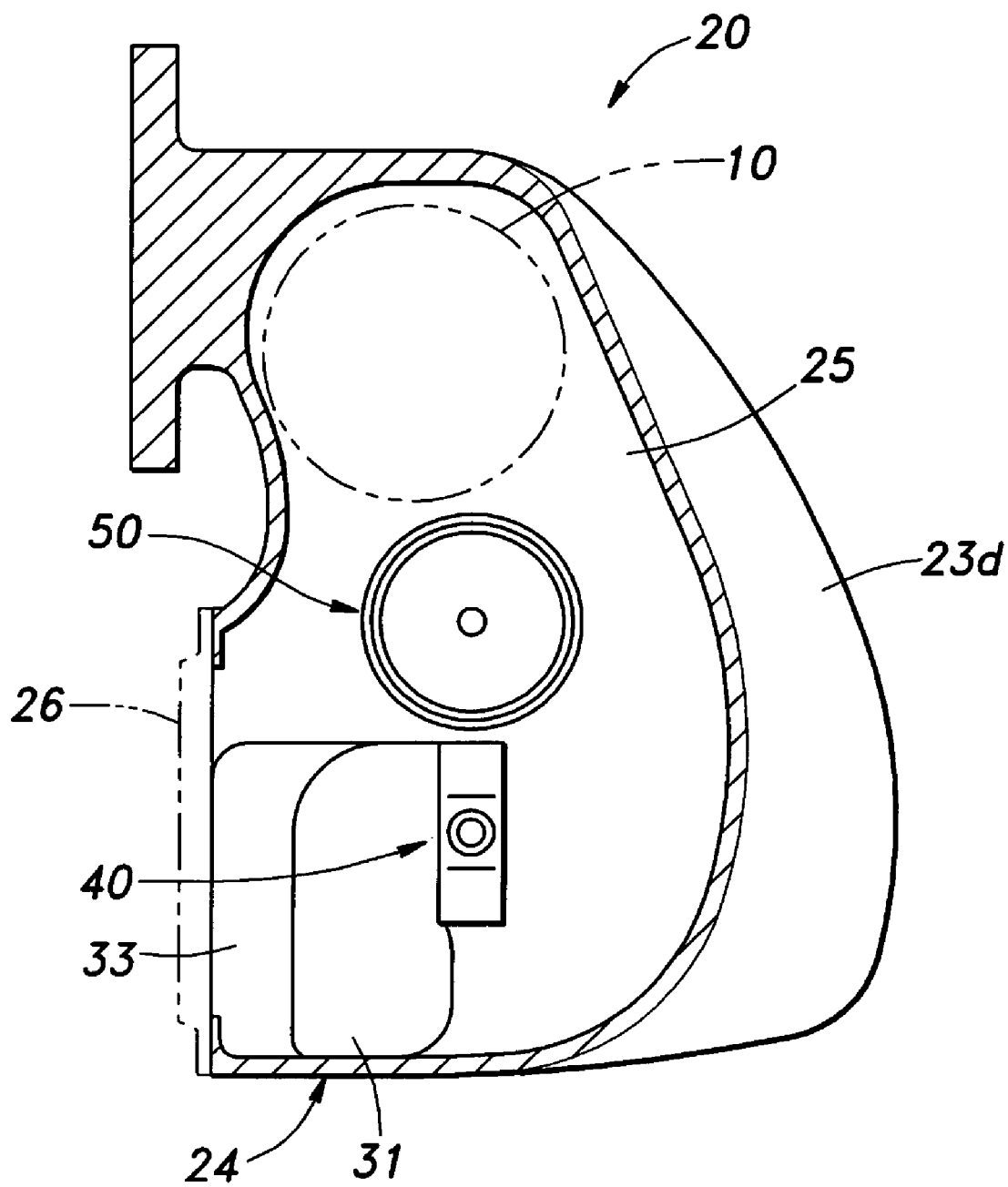
FIG. 3 is a sectional view taken along line III—III of FIG. 2.

The intake manifold 20 includes four intake branch passage shell portions 23a to 23d defining intake branch passages and a chamber shell potion 24 defining an intake chamber 31 and formed under the intake branch passages. As shown in FIGS. 2 and 3, the intake manifold 20 internally defines an inlet passage 25 for conducting the intake air supplied from the throttle unit 10 to the intake chamber 31. The intake manifold 20 further comprises a passage length control valve unit 40 and a variable communication unit 50 which are adapted to vary the intake mode depending on the operating condition of the engine 100 as will be described hereinafter.

Figure 4:
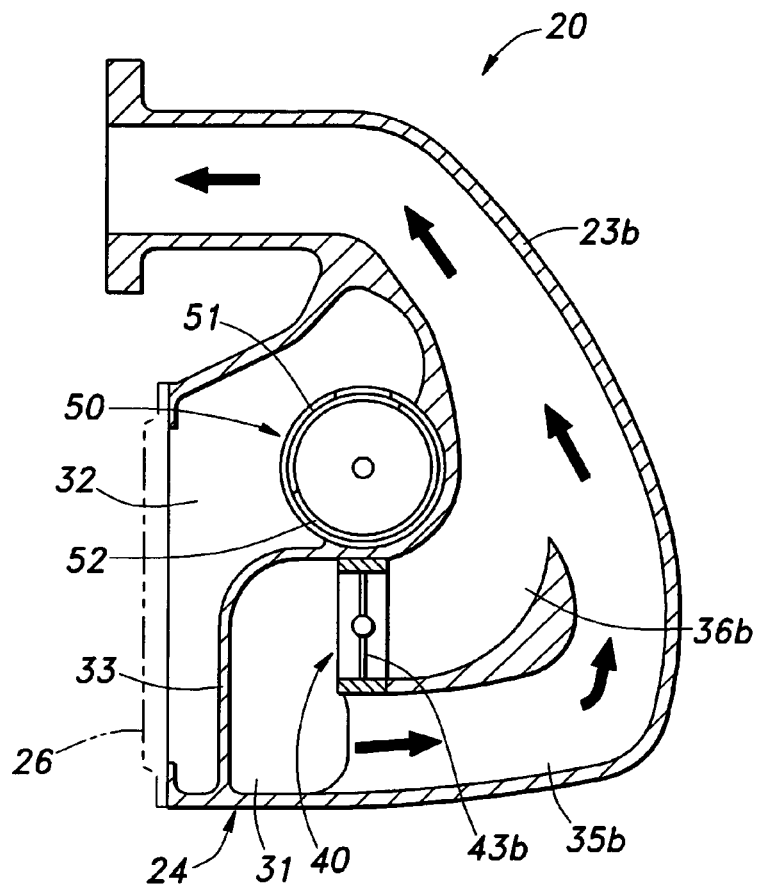
FIG. 4 is a sectional view taken along line IV—IV of FIG. 2.

As shown in FIGS. 2 and 4, the chamber shell potion 24 defines the intake chamber 31 interposed between the inlet passage 25 and intake branch passages defined by the intake branch passage shell portions 23a to 23d and a resonance chamber 32 consisting of a cul-de-sac chamber provided for the purpose of a resonance effect. In the illustrated embodiment, the resonance chamber 32 is separated from the intake chamber 31 by a partition wall 33 formed integrally with the intake manifold main body. The resonance chamber 32, the inlet passage 25 and a part of the intake chamber 31 are defined jointly by the intake manifold main body and a cover plate 26 which is made of a separate member and attached to a side of the manifold main body facing the engine 10. Because the cover plate 26 is detachable, it is possible to install the passage length control valve unit 40 and the variable communication unit 50 in the intake manifold, and service them when required.

As best shown in FIG. 4, the intake air introduced into the intake chamber 31 can reach the intake ports of the engine via two sets of intake passages or first intake passages 35a to 35d which are defined along an outer periphery of the intake manifold main body and relatively long in length and second intake passages 36a to 36d which are defined along an inner periphery of the intake manifold main body and relatively short in length. In FIG. 4, only one of the first intake passages 35b and one of the second intake passages 36b are shown. The first intake passages 35a to 35d are always in communication, but the second intake passages 36a to 36d communicate selectively by means of the passage length control valve unit 40.

Figure 5:
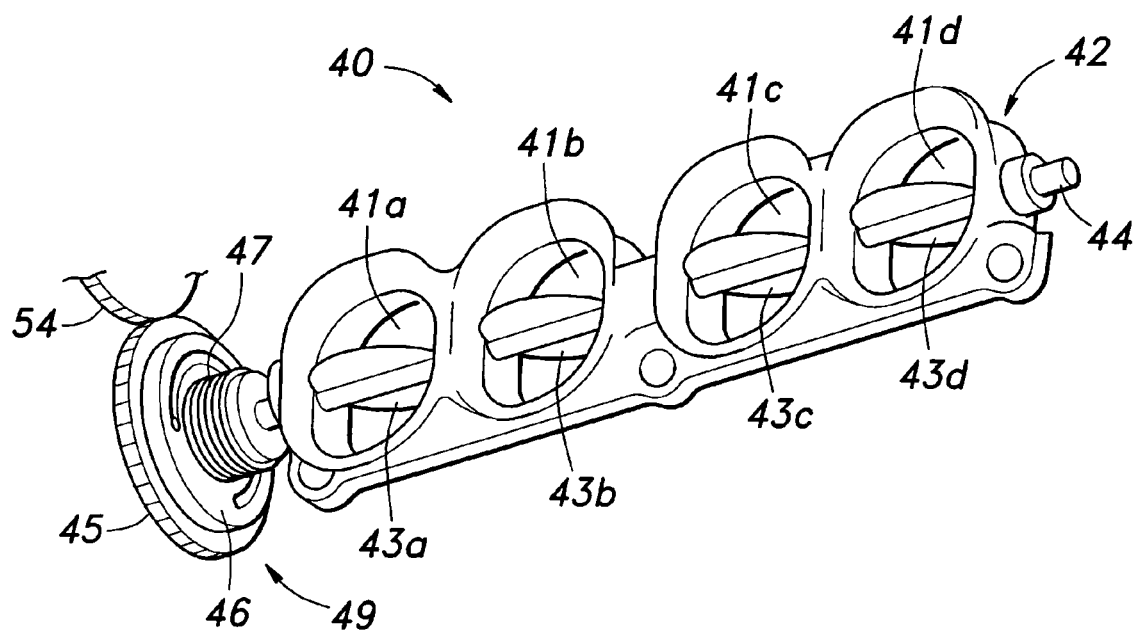
FIG. 5 is a perspective view of a passage length control valve unit according to the present invention.

As shown in FIG. 5, the passage length control valve unit 40 comprises a valve base 42 defining four openings 41a to 41d, butterfly valve members 43a to 43d jointly supported by a valve shaft 44 which is in turn pivotally supported by the valve base 42 so as to selectively close the corresponding openings 41a to 41d, a driven gear 45 coaxially mounted on one end of the valve shaft 44 via a connecting plate 46 and a return spring 47 which normally urges the connecting plate 46 in the direction to close the openings 41a to 41d with the butterfly valve members 43a to 43d. The driven gear 45 meshes with a drive gear 54 which is selectively actuated by an electric motor.

Figure 6:
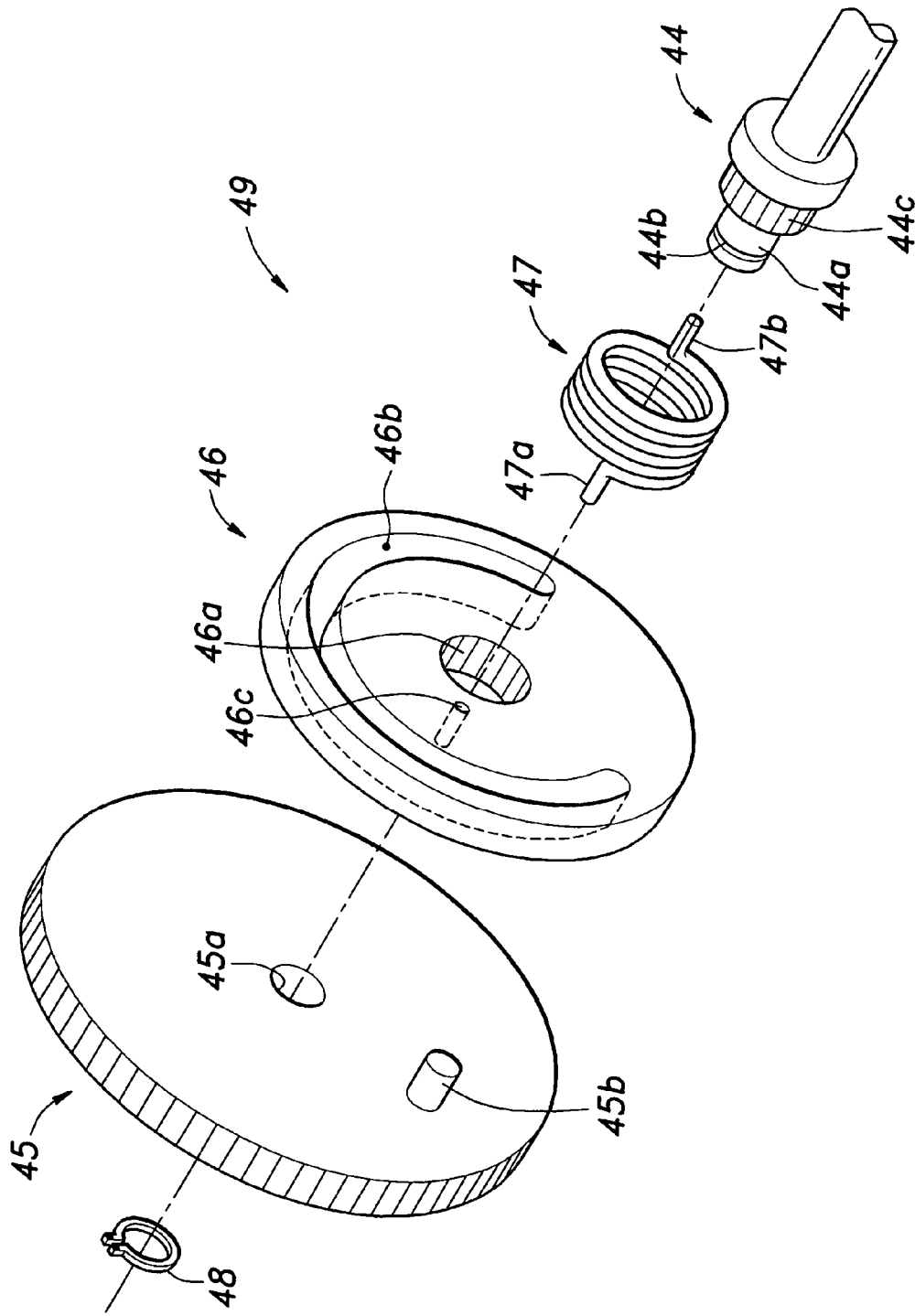
FIG. 6 is an exploded perspective view of an essential part of the passage length control valve unit.

As shown in FIG. 6, the valve shaft 44 is further provided with a gear support portion 44a rotatably fitted into a central bore 45a of the driven gear 45 at an end portion thereof, an annular groove 44b formed in an even further outer end portion of the valve shaft 44 than the gear support portion 44a for receiving a C clip 48 that retains the driven gear 45 on the gear support portion 44a and a spline portion 44c formed adjacent to the gear support portion 44a opposite from the annular groove 44b to be fitted into a central bore 46a of the connecting plate 46 provided with a similar spline in a rotationally fast manner. The inner side of the driven gear 45 is provided with an drive pin 45b.

The connecting plate 46 is provided with an arcuate slot 46b receiving the drive pin 45b and an axial hole 46c for receiving a coil end 47a of the return spring 47 which consists of a torsion coil spring. The other coil end 47b is fitted into an engagement hole (not shown in the drawings) formed in the valve base 42.

Figure 7A:
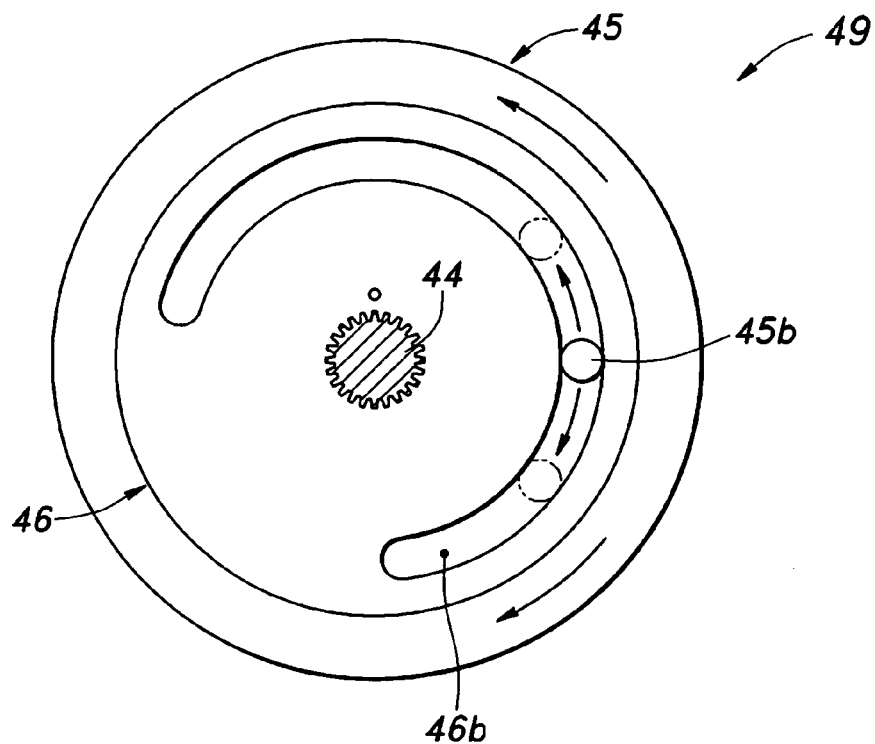
FIGS. 7a and 7b are diagrams showing the principle of the lost motion mechanism.
Figure 7B:
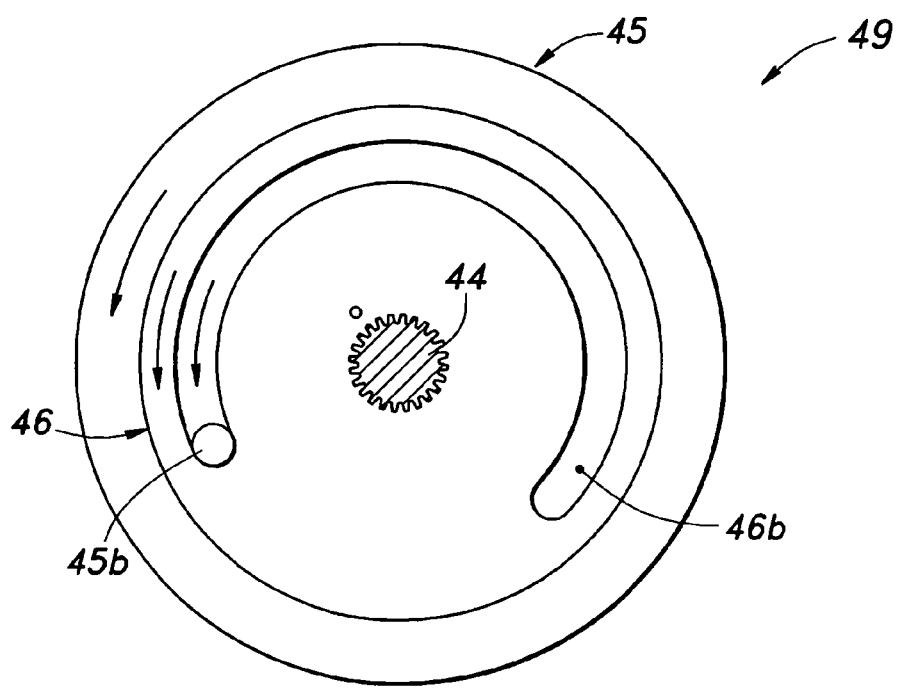

In the illustrated embodiment, the drive pin 45b of the driven gear 45 and arculate slot 46b of the connecting plate 46 jointly form a lost-motion mechanism 49. As illustrated in FIG. 7a, even when the driven gear 45 is turned, the connecting plate 47 remains stationary as long as the drive pin 45b moves within the arcuate slot 46b. When the driven gear 45 has turned in clockwise direction as seen from the side of the electric actuator 21 until the drive pin 45b comes into engagement with an end of the arcuate slot 46, the connecting plate 46 starts turning integrally with the driven gear 45 so that the valve members 43a to 43d connected to the connecting plate 46 via the valve shaft 44 start rotating in the direction to open: In the illustrated embodiment, the angular extent of the arcuate slot is 200 degrees.

As shown in FIGS. 2 and 4, the variable communication unit 50 is provided in an upper part of the resonance chamber 32. The variable communication unit 50 comprises an outer tube 51 press fitted or otherwise fixedly attached to the intake manifold 20, an inner tube 52 rotatably and closely received in the outer tube 51, a rotary shaft 53 centrally fixed to the inner tube 52 and having an end connected to the communication sensor 22, the driven gear 54 coaxially secured to the inner tube 52 and meshing with the driven gear 45 of the passage length control valve unit 40 and a spline shaft 55 coaxially secured to the rotary shaft 53 and connected to the electric actuator 21. In the illustrated embodiment, the driven gear 45 and drive gear 54 have a same diameter (number of teeth).

Figure 8:
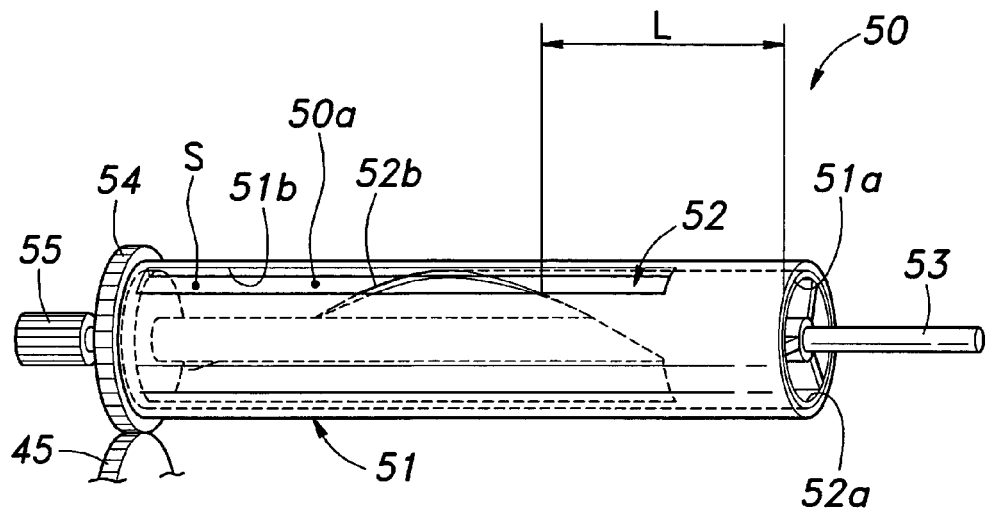
FIG. 8 is a perspective view of the variable communication unit according to the present invention.

As shown in FIGS. 8 and 9, an axial end of the outer tube 51 adjacent to the inlet passage 25 is provided with an axial opening 51a communicating with the inlet passage 25 and an axially elongated rectangular opening 51b which is formed in the outer circumferential wall of the outer tube 51. In the illustrated embodiment, the opening 51b consists of an axially extending linear slot, but may also consist of an oblique or spiral slot without departing from the spirit of the present invention. The inner tube 52 is provided with a communication inlet port 52a at the axial end on the same side as the axial opening 51a of the outer tube 51 and a window opening 52b formed in the outer circumferential wall of the inner tube 52. The window opening 52b is defined by a straight edge extending in the axial direction and a spiral edge opposing the straight edge so that the window opening 52b is given by a right angled triangle in a developed view of the outer shell of the inner tube 52. The part of the window opening 52b overlapping with the slot 51b of the outer tube 51 defines a communication outlet port 50a as indicated by a double-dot chain-dot line in FIG. 9. The interior of the inner tube 52 defines a communication passage that extends between the communication inlet port 52a and communication outlet port 50a. Therefore, the distance L between the communication inlet port 52a adjacent to the inlet passage 25 and communication outlet port 50a, and opening area S of the communication outlet port 50a change in dependence on the relative angle between the outer tube 51 and inner tube 52.

More specifically, as the inner tube 52 rotates in clockwise direction relative to the outer tube 51 as seen from the side of the inlet passage 25, the distance L decreases while the opening area S increases. In the illustrated embodiment, the relative angle $\theta ip$ between the outer tube 51 and inner tube 52 is zero in the state illustrated in FIG. 2 where the distance L is maximized and the opening area S is minimized.

FIG. 10 shows the changes in the distance L and opening area S, and the mode of operation of the passage length control valve unit 40 in relation to the angular displacement of the inner tube 52 of the variable communication unit 50. As shown in the drawing, the inner tube 52 of the variable communication unit 50 can rotate over the angular range of zero to 290 degrees. As the angular displacement $\theta ip$ of the inner tube 52 increases, the distance L progressively decreases and the opening area S progressively increases. The distance L as used herein means the distance between the communication inlet port 52a and the nearest edge of the communication outlet port 50*a*. Even when the variable communication unit 50 is actuated by the variable intake passage actuator 21, the valve members 43*a* to 43*d* of the passage length control valve unit 40 are kept fully closed as long as the angular displacement θip of the inner tube 52 is in the range of zero to 200 degrees on account of the action of the lost motion mechanism 49, and open when the angular displacement ƒip of the inner tube 52 is in the range of 200 degrees to 290 degrees in proportion to the increase in the angular displacement θip of the inner tube 52. In FIG. 10, for the clarity of illustration, the window opening 52*b* is shown in a developed view and the slot 51*b* (or the outer tube 51) is shown as moving in relation to the window opening 52*b* (or the inner tube 52).

When the vehicle operator has started the engine by operating the ignition key, the engine ECU 200 controls the throttle actuator 11 according to the throttle valve opening angle θth or depression of the throttle pedal 300 obtained from the accelerator position sensor 301. Thereby, the throttle actuator 11 operates in such a manner that the amount of mixture introduced into the combustion chambers of the engine 100 is suitably controlled and an engine output desired by the vehicle operator is produced.

At the same time, the engine ECU 200 controls the variable intake passage actuator 21 according to the engine rotational speed Ne obtained from the Ne sensor 102. According to the broad concept of the present invention, the ECU 200 may also take into account of other variables representing the operating condition of the engine in controlling the variable intake passage actuator 21. The variable intake passage actuator 21 drives the variable communication unit 50 (or both the variable communication unit 50 and passage length control valve unit 40) to maintain the intake efficiency at an optimum level. The engine ECU 200 controls variable intake passage actuator 21 by a feedback control by using the inner tube rotational angle θip of the variable communication unit 50 as a control variable.

For instance, when the rotational speed of the engine is low such as when the engine is idling, the frequency fi of the pressure pulsation of the intake air that passes through the inlet passage 25 is low. This frequency fi can be given by the following equation:

$$fi = (Ne/60) \cdot (2/Z) \cdot n \quad (1)$$

where Z is the stroke number of the engine and n is the number of cylinders. In the case of a four-stroke, four-cylinder engine, fi can be given as follows.

$$fi = (Ne/60) \cdot (2/4) \cdot 4 = Ne/30$$

At this time, the engine ECU 200 forwards a command signal to the variable intake passage actuator 21 to put the inner tube 52 of the variable communication unit 50 at such an angular position that θip=0. Therefore, the distance L between the communication inlet port 52*a* adjacent to the inlet passage 25 and communication outlet port 50*a* is maximized as shown in FIG. 10 so that the resonance frequency of the resonance chamber 32 can be made as low as possible. Thereby, the resonance frequency fe of the resonance chamber 32 can be matched to the frequency of the pressure pulsation of the intake air so that the intake efficiency can be improved and the intake noises can be reduced owing to the resonance supercharging and resonance noise damping effect. The resonance frequency fe of the resonance chamber 32 can be given by the following equation:

$$fe = (C/2\pi) \cdot (S1/VL)^{1/2} \quad (2)$$

where C is a constant, S1 is the cross sectional area of the communication outlet port 50*a*, and V is the volume of the resonance chamber 32.

When the angular displacement θip of the inner tube is 0 to 200 degrees, because the valve members 43*a* to 43*d* of the passage length control valve unit 40 remain to be closed owing to the action of the lost motion mechanism 49, the intake air in the intake chamber 31 is forwarded to the combustion chambers of the engine 100 via the first intake passages 35*a* to 35*d* having a relatively large length as shown in FIG. 4. As a result, even during a latter half of the intake stroke (during the upward stroke of the piston from the bottom dead center), the intake air is efficiently drawn into the combustion chambers owing to the inertia supercharging effect, and this improves the intake efficiency.

When the vehicle operator has depressed the accelerator pedal to a certain extent, the amount of the mixture introduced into the combustion chambers of the engine 100 increases and the rotational speed Ne of the engine increases. This also increases the frequency fi of the pressure pulsation of the intake air as can be appreciated from Equation (1). Upon receipt of the engine rotational speed Ne from the Ne sensor 102, the engine ECU 200 forwards a command to the variable intake passage actuator 21 so as to increase the angular displacement θip of the inner tube. This decreases the distance between the communication outlet port 50*a* and the communication inlet port 52*a* adjacent to the inlet passage 25, and raises the resonance frequency fe of the resonance chamber 32. By thus suitably selecting the resonance frequency fe of the resonance chamber 32, it is possible to match the resonance frequency fe of the resonance chamber 32 to the frequency fi of the pressure pulsation of the intake air in spite of the changes in the rotational speed Ne of the engine, and the resonance effect can be maintained at all times.

Figure 11:
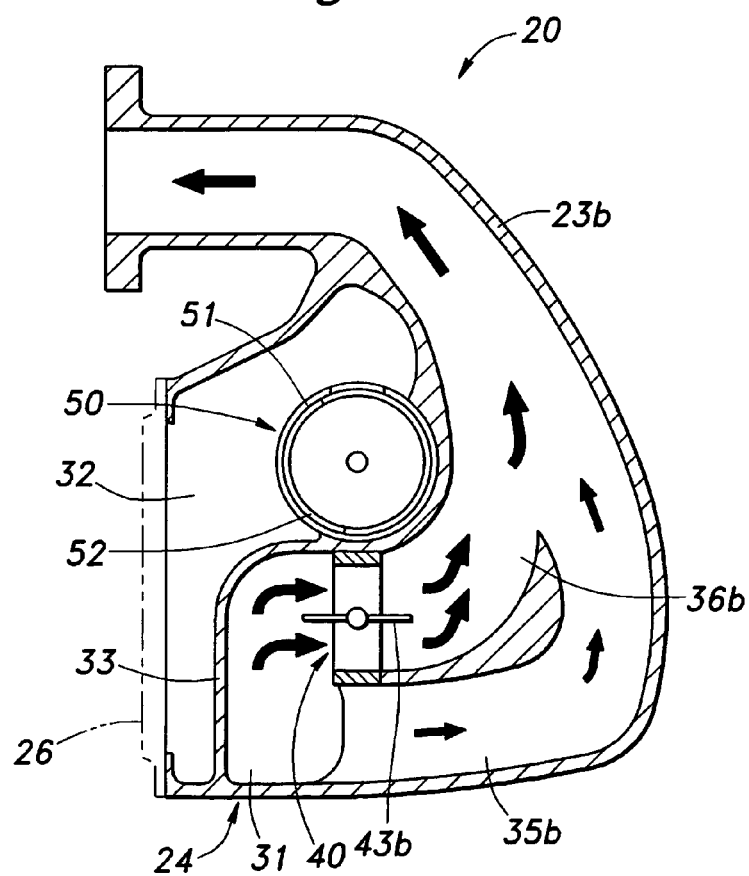
FIG. 11 is a simplified cross sectional view similar to FIG. 4 showing the mode of operation of the passage length control valve unit.

When the vehicle operator has depressed the accelerator pedal further, the engine rotational speed Ne eventually reaches a certain rotational speed Neth (3,000 rpm) selected for changing the length of the intake passage. When the Ne sensor 102 has indicated that such a rotational speed has been reached, the engine ECU 200 forwards a command to the variable intake passage actuator 21 so as to increase the angular displacement θip of the inner tube beyond the 200 degree angle. This not only decreases the distance L between the communication outlet port 50*a* and the communication inlet port 52*a* adjacent to the inlet passage 25 even further but also causes the valve members 43*a* to 43*d* of the passage length control valve unit 40 to start opening as soon as the drive pin 45*b* of the lost motion mechanism 49 engages the corresponding end of the arcuate slot 46*b*. Thereby, not only the resonance effect is continuously obtained but also the inertia supercharging corresponding to the engine rotational speed Ne owing to the increase in the length of the intake passages can be achieved. In other words, the intake air in the intake chamber 31 is forwarded to the combustion chambers of the engine 100 mostly via the second intake passages 36*a* to 36*d* having a relatively short length as indicated by arrows in FIG. 11, and the inertia charging is continuously achieved without regard to the rise in the frequency fi of the pressure pulsation of the intake air owing to the increase in the rotational speed Ne of the engine.

Figure 12:
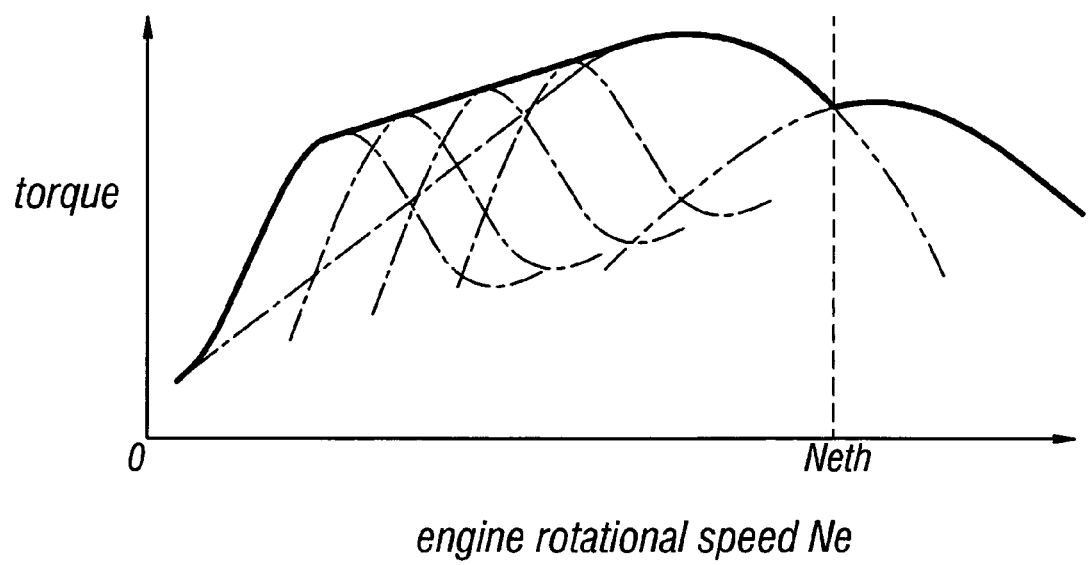
FIG. 12 is a graph showing the contributions of the changes in the length of the intake passage to the torque output.

Owing to the arrangement described above, the illustrated embodiment allows the output torque to be increased over a wide operating range as shown by the solid line in FIG. 12. In FIG. 12, the chain-dot lines indicate the torque outputs when the inlet passage 25 and resonance chamber 32 are connected to each other via communication pipes of four different fixed lengths, and the double-dot chain-dot lines indicate the torque outputs when intake pipes of two different fixed lengths are used.

Figure 13:
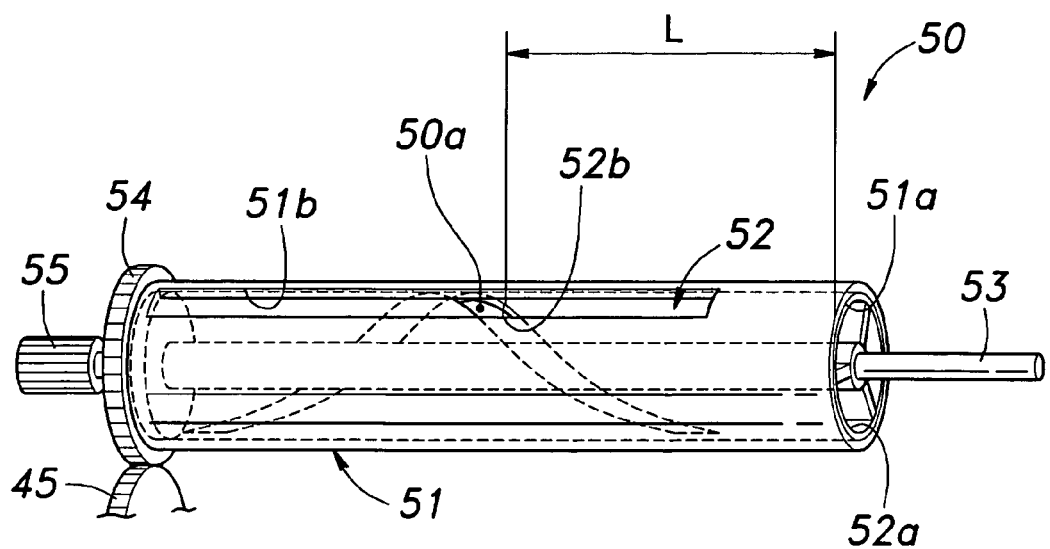
FIG. 13 is a view similar to FIG. 8 showing a modified embodiment of the present invention.

FIG. 13 is a perspective view showing a modified embodiment of the variable communication unit 50. In this embodiment, the window opening 52b of the inner tube 52 consists of a spiral slot so that only the distance L between the communication inlet port 52a adjacent to the inlet passage 25 and communication outlet port 50a changes while the opening area S of the communication outlet port 50a remains substantially unchanged as the inner tube 52 is turned.

Although the present invention has been described in terms of preferred embodiments thereof, it is obvious to a person skilled in the art that various alterations and modifications are possible without departing from the scope of the present invention which is set forth in the appended claims. For instance, although the foregoing embodiment was directed to an intake system of an automotive four-stroke, four-cylinder gasoline engine, the present invention can be applied equally to the intake systems of marine engines, two-stroke engines and V-type six cylinder engines, among other possibilities. In the foregoing embodiment the variable communication unit 50 and passage length control valve unit 40 were actuated by a same electric actuator, but it is also possible to use two separate electric actuators to actuate the variable communication unit 50 and passage length control valve unit 40. The actuator is not limited to an electric motor, but may also consist of a solenoid actuator, an air cylinder and so on. The lost motion mechanism interposed between the variable communication unit 50 and passage length control valve unit 40 may also consist of an arrangement using a lever and a pin or a cam. Also, the concrete structure of the intake chamber and resonance chamber are not limited to those used in the illustrated embodiment, but may also be suitably changed without departing from the spirit of the present invention.

The contents of the original Japanese patent application on which the Paris Convention priority claim is made for the present application are incorporated in this application by reference.

The invention claimed is:

1. An intake system for an internal combustion engine, comprising:
   an intake manifold defining an inlet passage, an intake passage communicating the inlet passage with an intake port of the engine and a resonance chamber communicating with the intake passage via a communication passage;
   an outer tube supported by the intake manifold and having an axial end communicating with the inlet passage and an opening defined in a circumferential wall thereof for communication with the resonance chamber;
   an inner tube rotatably and coaxially received in the outer tube, the inner tube defining a communication passage inlet port at an axial end on a same side as the axial end of the outer tube, an internal bore defining the communication passage, an opening defined in a circumferential wall thereof for defining a communication outlet port jointly with the opening in the circumferential wall of the outer tube; and
   a power actuator for turning at least one of the outer tube and inner tube according to an operating condition of the engine;
   wherein the openings of the inner tube and outer tube are configured such that at least one of a distance between the communication inlet port and communication outlet port, and an opening area of the communication outlet port changes in relation with a relative rotational angle between the inner tube and outer tube.

2. The intake system for an internal combustion engine according to claim 1, wherein the operating condition of the engine comprises a rotational speed of the engine.

3. The intake system for an internal combustion engine according to claim 1, wherein the power actuator turns at least one of the inner and outer tubes relative to each other in a direction to decrease the distance between the communication inlet port and communication outlet port as the rotational speed of the engine increases.

4. The intake system for an internal combustion engine according to claim 3, wherein the opening of one of the outer and inner tubes consists of a linear slot, and the opening of the other of the outer and inner tubes includes a triangular section.

5. The intake system for an internal combustion engine according to claim 3, wherein the opening of one of the outer and inner tubes consists of a linear slot, and the opening of the other of the outer and inner tubes includes a linear or spiral slot.

6. The intake system for an internal combustion engine according to claim 1, wherein the power actuator turns at least one of the inner and outer tubes relative to each other in a direction to increase the opening area of the communication outlet port as the rotational speed of the engine increases.

7. The intake system for an internal combustion engine according to claim 6, wherein the opening of one of the outer and inner tubes consists of a linear slot, and the opening of the other of the outer and inner tubes includes a triangular section.

8. The intake system for an internal combustion engine according to claim 1, wherein the intake passage includes a short intake passage and a long intake passage that are arranged parallel to each other, the intake system further comprising a valve for selectively closing the short intake passage and an actuator for actuating the valve in synchronism with the at least one of the outer and inner tubes that is actuated by the corresponding power actuator.

9. The intake system for an internal combustion engine according to claim 8, wherein the valve is actuated by the same actuator as that actuates one of the outer and inner tubes, via a lost motion mechanism.

10. The intake system for an internal combustion engine according to claim 1, wherein the intake manifold comprises a main body defining a flange surface adapted to abut the intake port of the engine, a partition wall that separates the resonance chamber from the intake passage, and a cover plate that defines at least the resonance chamber jointly with the partition wall.

11. The intake system for an internal combustion engine according to claim 10, wherein the cover plate is provided on a side of the intake manifold main body facing the engine.

12. The intake system for an internal combustion engine according to claim 10, wherein the cover plate defines a part of the inlet passage jointly with the intake manifold main body.

13. The intake system for an internal combustion engine according to claim 10, wherein the valve comprises a valve shaft which extends in parallel with a rotational axial line of the inner and outer tubes.

14. The intake system for an internal combustion engine according to claim 10, wherein the actuator for at least one of the outer and inner tubes is provided externally of the intake manifold main body.

* * * * *